United States Patent
Lee et al.

(10) Patent No.: US 6,703,764 B2
(45) Date of Patent: Mar. 9, 2004

(54) POINTING APPARATUS USING PIEZOELECTRIC FILM, METHOD FOR PRODUCING THE APPARATUS, APPARATUS AND METHOD FOR DETECTING POINTING INFORMATION THEREOF

(75) Inventors: Woo-jong Lee, Suwon (KR); Woo-jong Cho, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 73 days.

(21) Appl. No.: 10/086,429

(22) Filed: Mar. 4, 2002

(65) Prior Publication Data
US 2003/0057808 A1 Mar. 27, 2003

(30) Foreign Application Priority Data
Sep. 27, 2001 (KR) .......................... 2001-60238

(51) Int. Cl.[7] .............................. H01L 41/08
(52) U.S. Cl. .................. 310/328; 310/319; 310/339; 310/366
(58) Field of Search .................. 310/339, 319, 310/328, 366, 338, 800

(56) References Cited
U.S. PATENT DOCUMENTS

| | | | | |
|---|---|---|---|---|
| 4,071,785 A | * | 1/1978 | Yoshida et al. .............. 310/331 |
| 4,328,441 A | * | 5/1982 | Kroeger et al. .............. 310/319 |
| 4,394,773 A | * | 7/1983 | Ruell .......................... 382/124 |
| 4,634,917 A | * | 1/1987 | Dvorsky et al. ............. 310/328 |
| 4,824,107 A | * | 4/1989 | French ........................ 273/454 |

* cited by examiner

Primary Examiner—Mark Budd
(74) Attorney, Agent, or Firm—Sughrue Mion, PLLC (57) ABSTRACT

A pointing apparatus using a piezoelectric film, a method for producing the apparatus, and apparatus and method for detecting pointing information therefor are provided. The pointing apparatus includes a plurality of first strips arranged in a first direction at a first predetermined interval, each of which is extended in a second direction perpendicular to the first direction and is touched when a pointer is moved in the first direction, and a plurality of second strips, which are lapped over the plurality of the first strips and arranged in the second direction at a second predetermined interval, each of which is extended in the first direction and is touched when the pointer is moved in the second direction. Each of the first and second strips generates electric charges in a quantity corresponding to pressure applied by a user and outputs touch signals having levels corresponding to the quantity of the electric charges, and moving direction and amount of movement of the pointer are determined by the number of times and the order in which the touch signals are generated. The pointing apparatus can be folded and thus is convenient to carry, can input pointing information by using the part of the human body, for example, finger(s) without a special tool such as a ball or pen, and thus is convenient to use and its manufacturing costs can be reduced.

15 Claims, 9 Drawing Sheets

FIG. 11A
FIG. 11B
FIG. 11C

POINTING APPARATUS USING PIEZOELECTRIC FILM, METHOD FOR PRODUCING THE APPARATUS, APPARATUS AND METHOD FOR DETECTING POINTING INFORMATION THEREOF

BACKGROUND OF THE INVENTION

1. Field of the Invention

The present invention relates to a pointing device, and more particularly, to a pointing apparatus using a piezoelectric film, a method for producing the apparatus, and apparatus and method for detecting pointing information therefor. The present application is based on Korean Application No. 2001-60238, which is incorporated herein by reference.

2. Description of the Related Art

A conventional apparatus for detecting pointing information can input pointing information from the outside by using a special tool such as a ball or pen. When a disposable ball or pen is lost or worn out, the conventional apparatus for detecting pointing information cannot input pointing information and therefore a ball or pen should be kept for inputting pointing information.

Since the conventional apparatus for detecting pointing information, for example, a mouse, is comprised of elements having a certain size, the mouse cannot be folded or unfolded, and thereby there are limitations in using the mouse.

SUMMARY OF THE INVENTION

To solve the above problems, it is a first objective of the present invention to provide a pointing apparatus using a piezoelectric film, which is convenient to carry, is capable of inputting pointing information without a special tool, and can be manufactured with low costs.

It is a second objective to provide a method for producing the pointing apparatus using a piezoelectric film.

It is a third objective to provide an apparatus for detecting pointing information, that is, a moving direction and the amount of movement, by using touch signals, which are generated by the pointing apparatus using a piezoelectric film.

It is a fourth objective to provide a method for detecting pointing information, that is, a moving direction and the amount of movement, by using touch signals, which are generated by the pointing apparatus using a piezoelectric film.

Accordingly, to achieve the first objective, there is provided a pointing apparatus using a piezoelectric film. The apparatus includes a plurality of first strips arranged in a first direction at a first predetermined interval, each of which is extended in a second direction perpendicular to the first direction and is touched when a pointer is moved in the first direction, and a plurality of second strips, which are lapped over the plurality of the first strips and arranged in the second direction at a second predetermined interval, each of which is extended in the first direction and is touched when the pointer is moved in the second direction. Each of the first and second strips generates electric charges in a quantity corresponding to pressure applied by a user and outputs touch signals having levels corresponding to the quantity of the electric charges, and moving direction and amount of movement of the pointer are determined by the number of times and the order in which the touch signals are generated.

To achieve the second objective, there is provided a method for producing the pointing apparatus using a piezoelectric film. The method includes the steps of forming the part of the first strips in a first layer, forming the remainder of the first strips in a second layer, forming part of the second strips in a third layer, and forming the remainder of the second strips in a fourth layer, interlacing the second layer with the first layer to form the first strips in a common layer, and interlacing the fourth layer with the third layer to form the second strips in another common layer, lapping the common layer having the first strips over another common layer having the second strips so that the first strips perpendicularly intersect the second strips, and housing the lapped-over layers.

It is preferable that a method for producing the pointing apparatus using a piezoelectric film includes the steps of forming all the first strips in a fifth layer and forming all the second strips in a sixth layer, lapping the fifth layer over the sixth layer so that the first strips perpendicularly intersect the second strips, and housing the lapped-over layers.

To achieve the third objective, there is provided an apparatus for detecting pointing information. The apparatus includes a signal converting portion for converting the touch signals generated from the first strips into square waves, outputting the square waves as first information signals, converting the touch signals generated from the second strips into square waves, and outputting the square waves as second information signals, a first direction detecting portion for checking the order in which the first information signals are generated, and detecting a component of the first direction of the moving direction from the checked order, and a second direction detecting portion for checking the order in which the second information signals are generated, and detecting a component of the second direction of the moving direction from the checked order. The moving direction corresponds to the pointing information.

It is preferable that the apparatus further includes a first movement amount detecting portion for measuring the number of times in which the first information signals are generated in each predetermined time period, and outputting the number of times as the amount of movement of the first direction, and a second movement amount detecting portion for measuring the number of times in which the second information signals are generated in each predetermined time period, and outputting the number of times as the amount of movement of the second direction. The amount of movement corresponds to the pointing information.

To achieve the fourth objective, there is provided a method for detecting pointing information. The method includes the steps of (a) converting the touch signals generated from the first strips into square waves to obtain the first information signals and converting the touch signals generated form the second strips into the square waves to obtain the second information signals, and (b) checking the order in which the first and second information signals are generated and detecting the components of the first and second directions from the checked order.

It is preferable that in step (b), the numbers of times in which the first and second information signals are generated in each predetermined time period are measured, and the numbers of times are determined as the amounts of movement of the first and second directions, respectively.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Hereinafter, the structure of a pointing apparatus using a piezoelectric film according to the present invention will be described below with reference to the accompanying drawings.

Figure 1A:
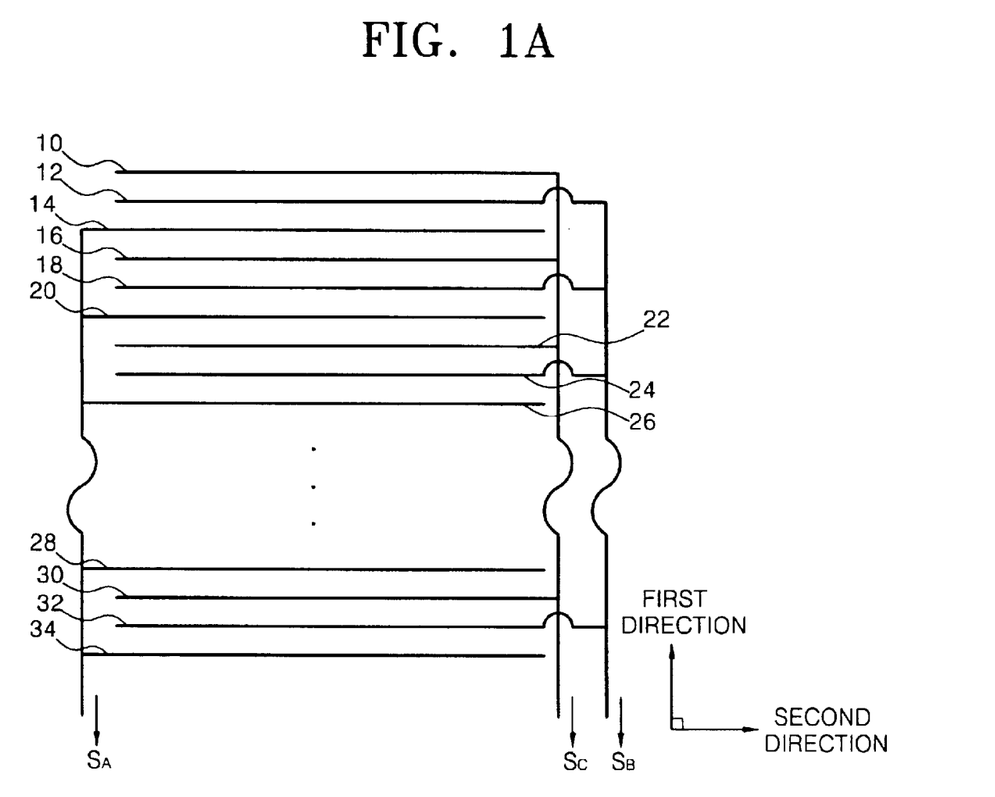
FIGS. 1A and 1B illustrate an embodiment of a pointing apparatus using a piezoelectric film according to the present invention.
Figure 1B:
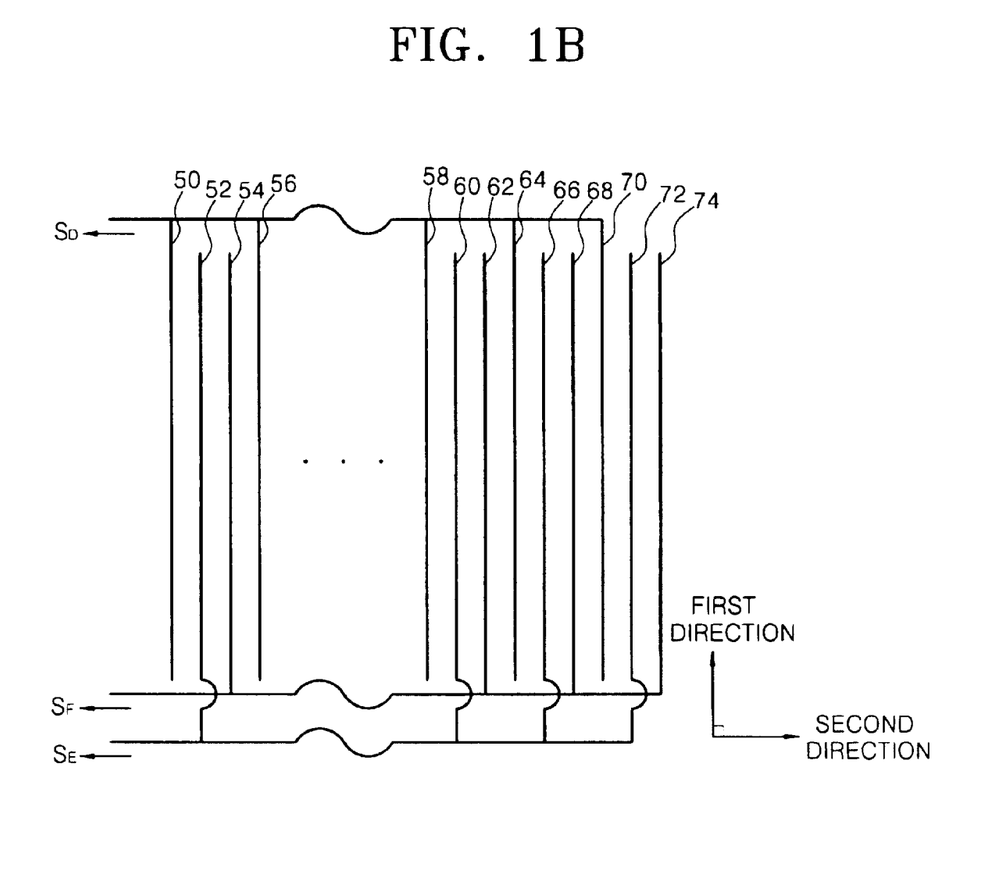

Referring to FIGS. 1A and 1B, which illustrate an embodiment of a pointing apparatus using a piezoelectric film according to the present invention, FIG. 1A illustrates first strips 10~34, and FIG. 1B illustrates second strips 50~74.

The pointing apparatus includes first and second strips. A plurality of first strips 10~26 shown in FIG. 1A are arranged in line in a first direction at a first predetermined interval, each of the first strips 10~34 is extended in a second direction, which is perpendicular to the first direction, and touched by a user who wants to move a pointer in the first direction. A plurality of second strips 50~74 shown in FIG. 1B are arranged in line in a second direction at a second predetermined interval, each of the second strips 50~74 is extended in the first direction and touched by a user who wants to move a pointer in the second direction.

Figure 2:
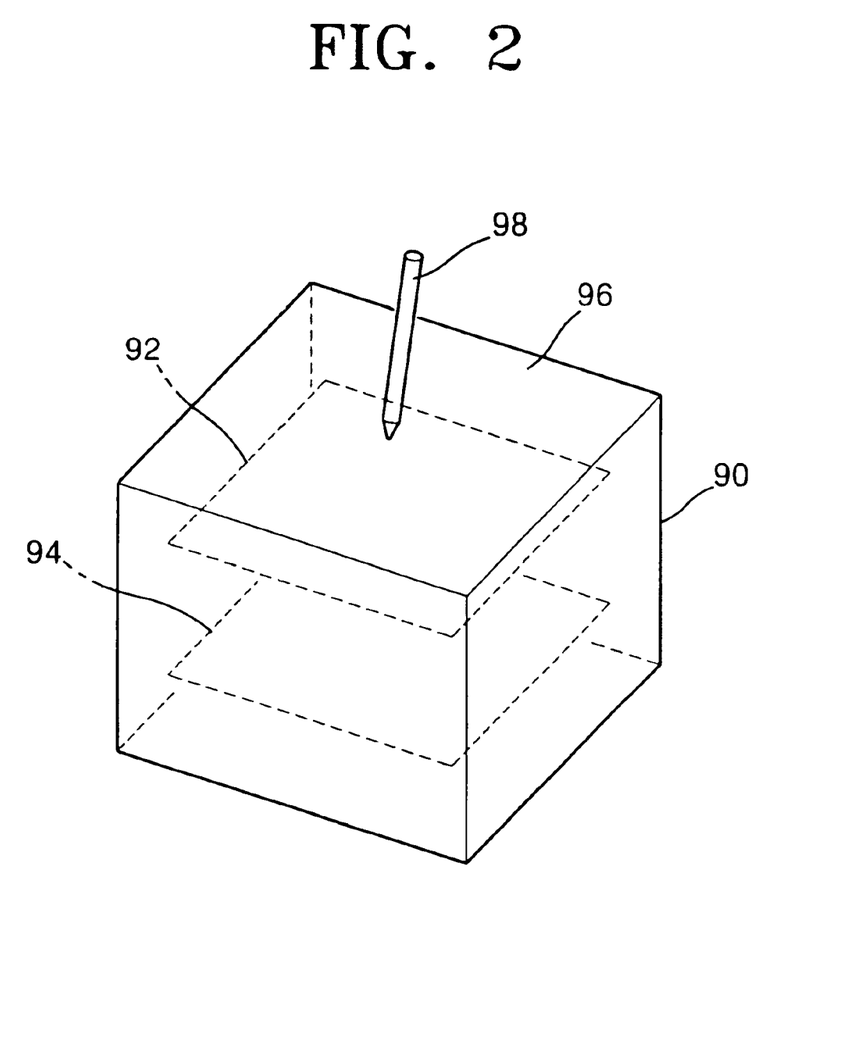
FIG. 2 illustrates an appearance of the pointing apparatus having first and second strips, respectively, shown in FIGS. 1A and 1B according to the present invention.

FIG. 2 illustrates an appearance of the pointing apparatus having first and second strips, respectively, shown in FIGS. 1A and 1B according to the present invention and illustrates first and second strips 92 and 94 or 94 and 92 and an external protection cover 90.

As shown in FIG. 2, the first strips 10~34 shown in FIG. 1A and the second strips 50~74 shown in FIG. 1B are lapped over one another. That is, the first strips 10~26 (92) may be lapped over the second strips 50~74 (94), or the second strips 50~74 (92) may be lapped over the first strips 10~34 (94).

Each of the first and second strips, respectively, shown in FIGS. 1A and 1B is implemented with a piezoelectric film, generates electric charges in a quantity corresponding to pressure applied by a user, and outputs touch signals $S_A$, $S_B$, $S_C$, $S_D$, $S_E$, and $S_F$ having levels corresponding to the quantity of the generated electric charges. According to the present invention, a piezoelectric film is preferably polyvinylidene fluoride (PVDF). In such a case, the generated touch signals $S_A$, $S_B$, $S_C$, $S_D$, $S_E$, or $S_F$ will be described below.

As shown in FIG. 1A, in order to discriminate the generation order of the touch signals $S_A$, $S_B$, $S_C$, $S_D$, $S_E$, and $S_F$ when a user touches the first strips 10~26 in the first direction, the touched first strips 14, 20, 26, ..., 28, 34, ... are connected to generate the same touch signal $S_A$, the touched first strips 12, 18, 24, ..., 32, ... are connected to generate the same touch signal $S_B$, and the touched first strips 10, 16, 22, ..., 30, ... are connected to generate the same touch signal $S_C$. As shown in FIG. 1B, in order to discriminate the generation order of the touch signals $S_A$, $S_B$, $S_C$, $S_D$, $S_E$, and $S_F$ when the user touches the second strips 50~74 in the second direction, the touched second strips ..., 50, 56, ..., 58, 64, and 70 are connected to generate the same touch signal $S_D$, the touched second strips ..., 52, ..., 60, 66, and 72 are connected to generate the same touch signal $S_E$, and the touched second strips ..., 54, ..., 62, 68, and 74 are connected to generate the same touch signal $S_F$. That is, the first or second strips 10~34 or 50~74 are interlaced. However, the present invention is not limited to this, and the first or second strips 10~34 or 50~74 may be not interlaced.

Hereinafter, for understanding of the present invention, an assumption that each of the first and second strips 10~34 and 50~74 are interlaced with one another, respectively, as shown in FIGS. 1A and 1B, is made.

According to the present invention, when the user wants to move the pointer in a moving direction with the amount of movement, that is, when the user wants to input the moving direction and the amount of movement, a top surface 96 of the pointing apparatus shown in FIG. 2 may be touched by using a part of the human body, for example, a finger. Thus, unlike a conventional pointing apparatus, a special tool is not required in the present invention. However, the user of the pointing apparatus according to the present invention can touch the top surface 96 by using the special tool 98 such as a pen or ball. In such a case, each of the first and second predetermined intervals becomes wider as the radius of curvature of finger or the tool 98 becomes larger. This is the reason touch signals $S_A$, $S_B$, $S_C$, $S_D$, $S_E$, and $S_F$, which are generated when each of the first and second strips 10~34 and 50~74 is touched by the user, are discretely generated.

Hereinafter, methods for producing the pointing apparatus using a piezoelectric film according to the present invention will be described below with reference to the accompanying drawings.

Figure 3:
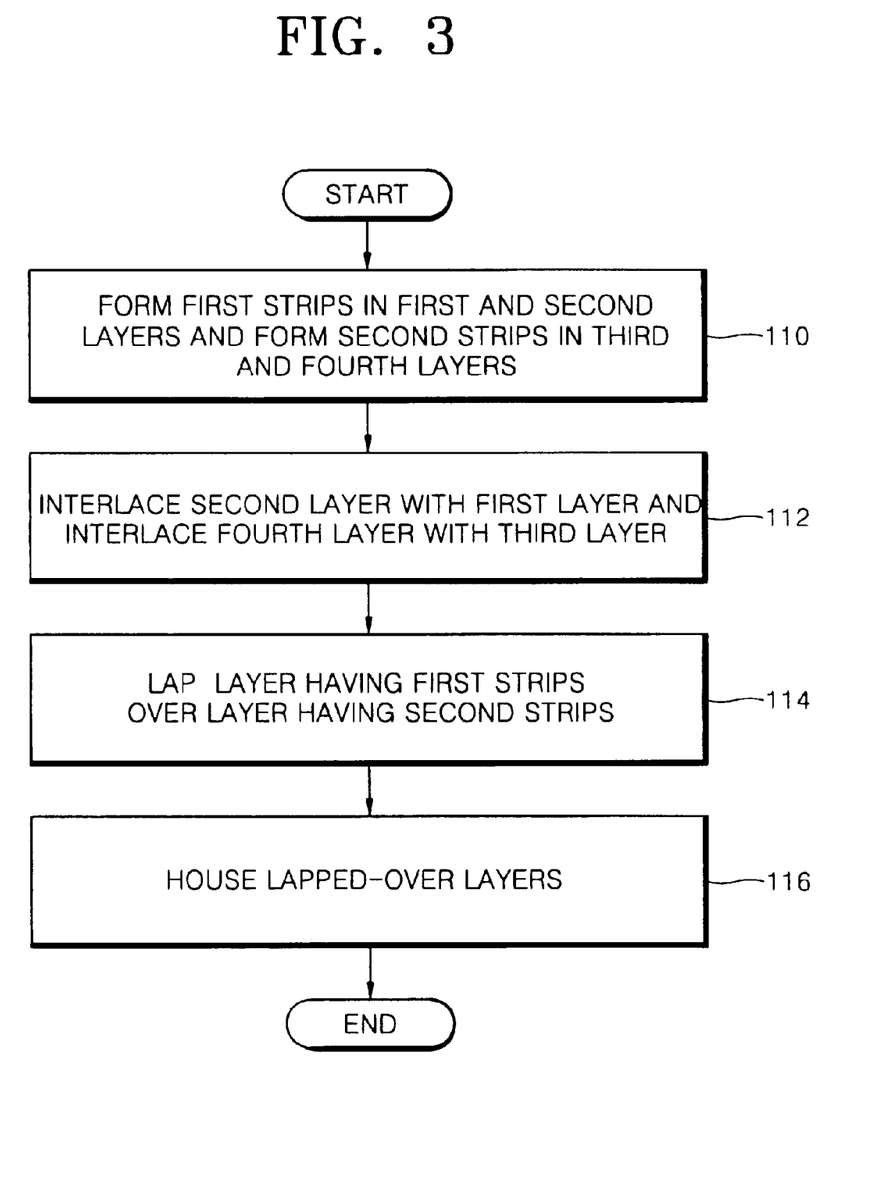
FIG. 3 is a flow chart illustrating an embodiment of a method for producing the pointing apparatus according to the present invention.

Referring to FIG. 3, which is a flow chart illustrating an embodiment of a method for producing the pointing apparatus according to the present invention, the method includes steps of forming first strips in separate layers and interlacing one layer with another layer, forming second strips in separate layers and interlacing one layer with another layer (steps 110 and 112), and lapping the interlaced layers over one another and housing the lapped-over layers (steps 114 and 116).

In an embodiment of the present invention, in order to produce the pointing apparatus using a piezoelectric film, in step 110, part of the first strips are formed in a first layer, the remainder of the first strips are formed in a second layer, part of the second strips are formed in a third layer, and the remainder of the second strips are formed in a fourth layer. After step 110, the second layer is interlaced with the first layer, thereby forming the first strips in a common layer, and the fourth layer is interlaced with the third layer, thereby forming the second strips in another common layer in step 112.

For example, in step 110, the part 14, 20, 26, . . . , 28, 34, . . . of the first strips shown in FIG. 1A may be formed in the first layer, the remainder of the first strips 10, 12, 16, 18, 22, 24, . . . , 30, 32, . . . may be formed in the second layer, or the part 12, 14, 18, 20, 24, 26, . . . , 28, 32, 34, . . . of the first strips may be formed in the first layer, and the remainder of the first strips 10, 16, 22, . . . , 30, . . . may be formed in the second layer. Further, in step 110, the part . . . , 50, 56, . . . , 58, 64, and 70 of the second strips shown in FIG. 1B may be formed in the third layer, the remainder of the second strips . . . , 52, 54, . . . , 60, 62, 66, 68, 72, and 74 can be formed in the fourth layer, or the part . . . , 50, 52, 56, . . . , 58, 60, 64, 66, 70, and 72 of the second strips can be formed in the third layer, and the remainder of the second strips . . . , 54, . . . , 62, 68, and 74 can be formed in the fourth layer. After step 110, the first layer may be interlaced with the second layer, thereby forming all the first strips shown in FIG. 1A in a common layer, that is, in a single layer, and the third layer may be interlaced with the fourth layer, thereby forming all the second strips shown in FIG. 1B in another common layer, that is, in another single layer in step 112.

In steps 110 and 112, the part 14, 20, 26, . . . , 28, 34, . . . of the first strips, another part 12, 18, 24, . . . , 32, . . . of the first strips, and the remainder of the first strips 10, 16, 22, . . . , 30, . . . may be formed and interlaced with different layers, and the part . . . , 50, 56, . . . , 58, 64, and 70 of the second strips, another part . . . , 52, . . . , 60, 66, and 72 of the second strips, and the remainder of the second strips . . . , 54, . . . , 62, 68, and 74 may be formed and interlaced with different layers.

After step 112, the layer having the first strips is lapped over the layer having the second strips so that the first strips perpendicularly intersect the second strips in step 114. That is, as described above, the first strips 92 may be lapped over the second strips 94, or the second strips 92 may be lapped over the first strips 94.

After step 114, as shown in FIG. 2, the lapped-over layers 92 and 94 are housed with the external protection cover 90 in step 116.

Figure 4:
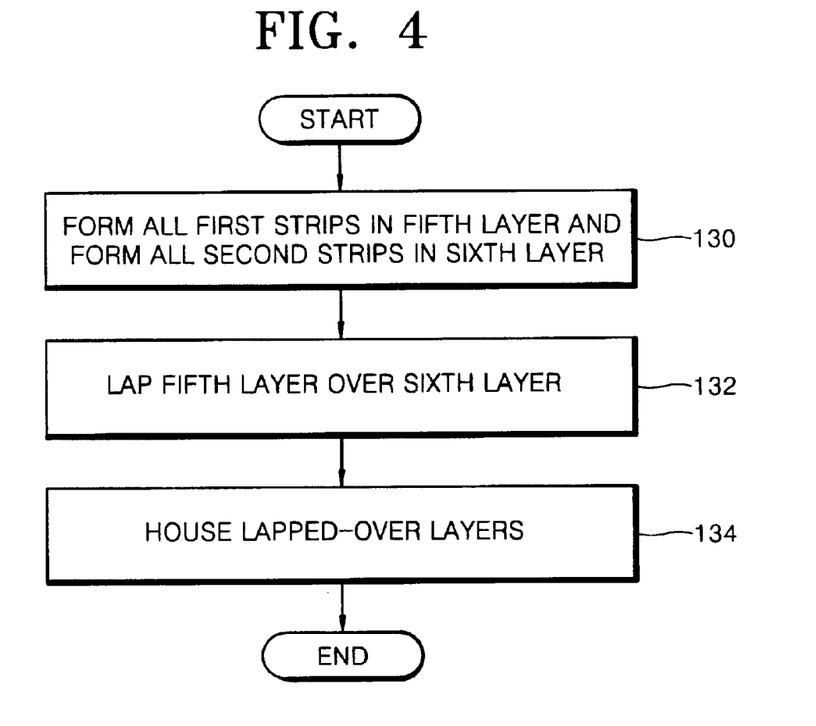
FIG. 4 is a flow chart illustrating another embodiment of the method for producing the pointing apparatus according to the present invention.

Referring to FIG. 4, which is a flow chart illustrating another embodiment of the method for producing the pointing apparatus according to the present invention, the method includes the steps of forming the first and second strips in fifth and sixth layers, respectively, lapping the first and second strips over one another, and housing the lapped-over layers (steps 130 through 134).

In another embodiment of the present invention, in order to produce the pointing apparatus using a piezoelectric film, all the first strips are formed in the fifth layer, and all the second strips are formed in the sixth layer in step 130. After step 130, the fifth layer is lapped over the sixth layer so that the first strips perpendicularly intersect the second strips in step 132. After step 132, the lapped-over layers are housed in step 134.

As shown in FIG. 4, preferably, all the first or second strips are formed in a single layer but may be formed in separate layers so as to easily make patterns, as shown in FIG. 3.

The pointing information which the user wants, that is, a moving direction and the amount of movement, of the pointer can be detected through the number of times and order, in which the touch signals are generated by the pointing apparatus as shown in FIG. 1.

Hereinafter, a method for detecting pointing information according to the present invention for the pointing apparatus using a piezoelectric film according to the present invention and the structure and operation of an apparatus for detecting pointing information according to the present invention, which performs the method, will be described below with reference to the accompanying drawings.

Figure 5:
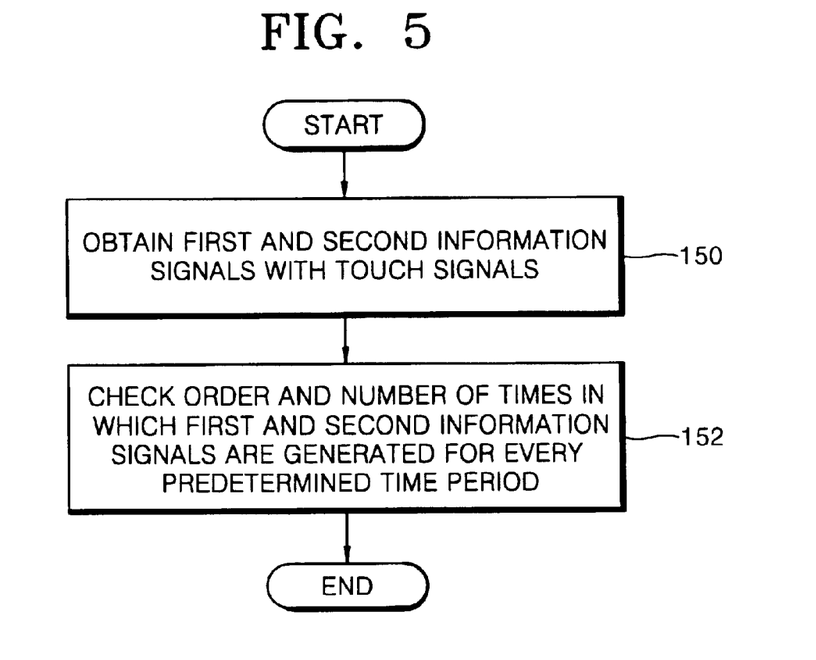
FIG. 5 is a flow chart illustrating a method for detecting pointing information according to the present invention.

Referring to FIG. 5, which is a flow chart illustrating a method for detecting pointing information according to the present invention, the method includes steps of detecting pointing information by using first and second information signals, which are obtained with the touch signals generated by the pointing apparatus (steps 150 and 152).

Figure 6:
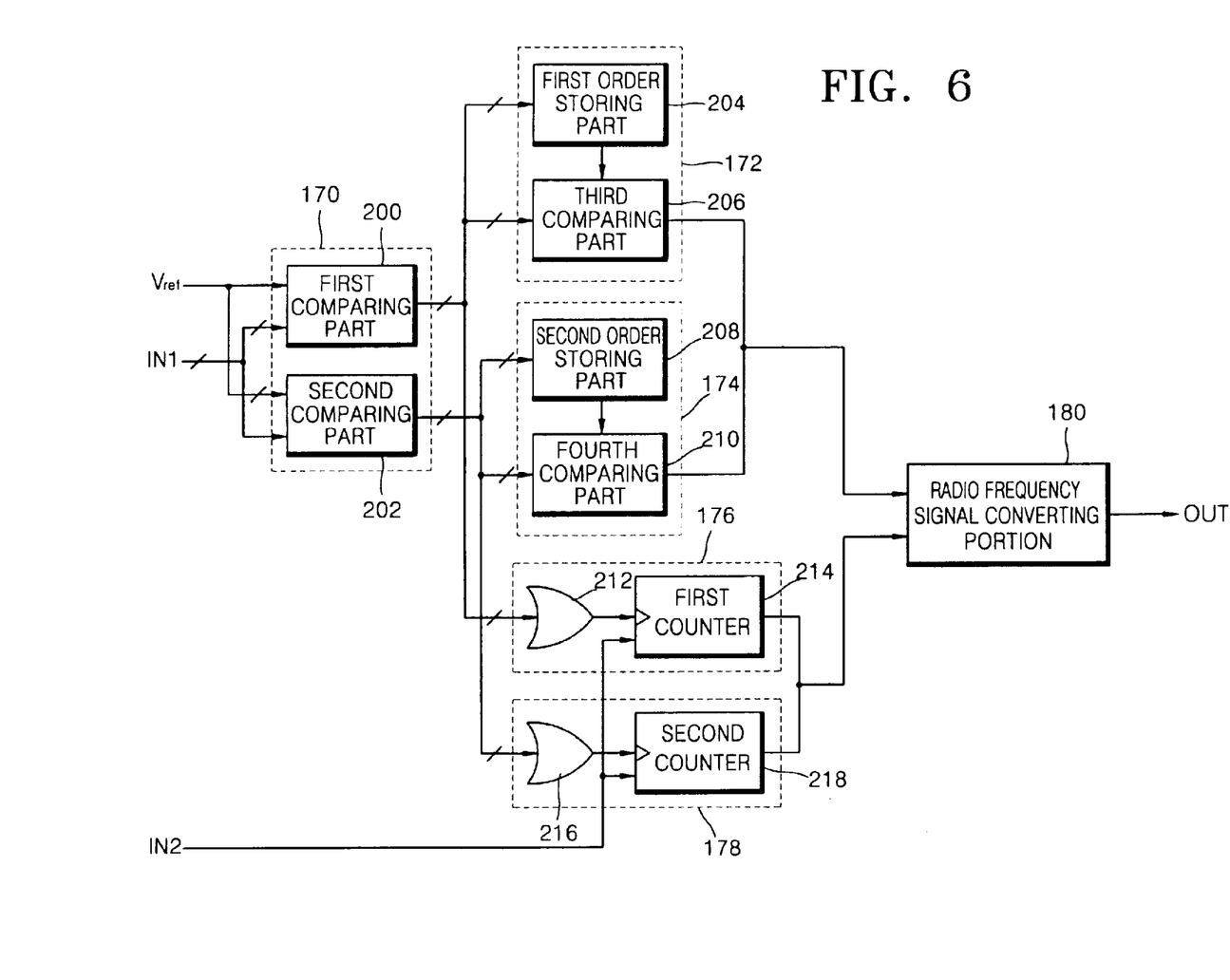
FIG. 6 is a block diagram illustrating an embodiment of an apparatus for detecting pointing information according to the present invention, which is implemented by the method for detecting pointing information shown in FIG. 5.

Referring to FIG. 6, which is a block diagram illustrating an embodiment of an apparatus for detecting pointing information according to the present invention, which performs the method for detecting pointing information shown in FIG. 5, the apparatus includes a signal converting portion 170, first and second direction detecting portions 172 and 174, first and second movement amount detecting portions 176 and 178, and a radio frequency signal converting portion 180.

Pointing information, that is, a moving direction and the amount of movement, are detected by the method for detecting pointing information according to the present invention as described below.

The signal converting portion 170 converts touch signals $S_A$, $S_B$, and $S_C$, which are generated from the first strips shown in FIG. 1A and input into an input terminal IN1, into square waves, outputs the square waves as first information signals $S_A'$, $S_B'$, and $S_C'$ to the first direction detecting portion 172 and the first movement amount detecting portion 176, converts touch signals $S_D$, $S_E$, and $S_F$, which are generated from the second strips shown in FIG. 1B and input into the input terminal In1, into square waves, outputs the square waves as second information signals $S_D'$, $S_E'$, and $S_F'$ to the second direction detecting portion 174 and the second movement amount detecting portion 178 in step 150. For performing step 150, the signal converting portion 170 may be implemented by first and second comparing parts 200 and 202. The first comparing part 200 compares levels of the touch signals $S_A$, $S_B$, and $S_C$, which are generated from the first strips shown in FIG. 1A and input into the input terminal IN1, with a reference voltage Vref, outputs the result of comparison as the first information signals $S_A'$, $S_B'$, and $S_C'$ to the first direction detecting portion 172 and the first movement amount detecting portion 176. The second comparing part 202 compares levels of the touch signals $S_D$, $S_E$, and $S_F$, which are generated from the second strips shown in FIG. 1B and input into the input terminal In1, with the reference voltage Vref, outputs the result of comparison as the second information signals $S_D'$, $S_E'$, and $S_F'$ to the second direction detecting portion 174 and the second movement amount detecting portion 178. The shape of touch signals and square waves will be described below.

Figure 7A:
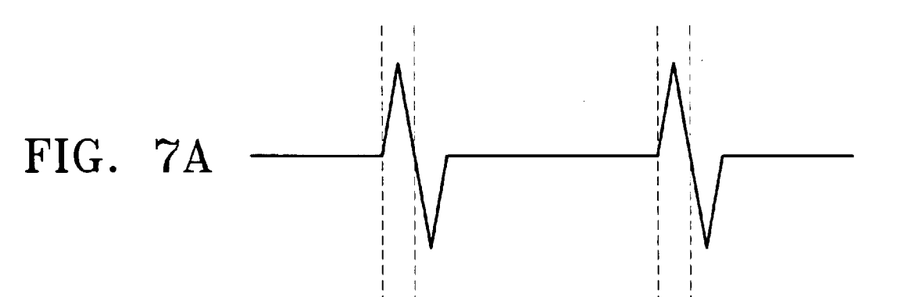
FIGS. 7A and 7B illustrate waveforms of a touch signal and a first (or second) information signal, respectively.
Figure 7B:
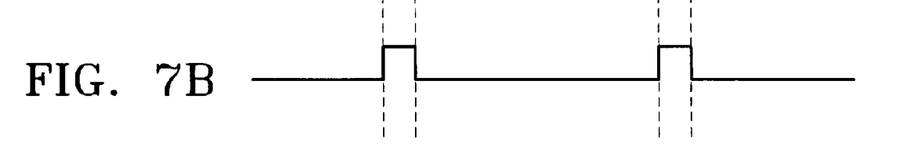

FIGS. 7A and 7B illustrate waveforms of a touch signal and a first (or second) information signal, respectively.

The signal converting portion 170 shown in FIG. 6 converts the touch signals shown in FIG. 7A, which are input to the input terminal In1, into square waves shown in FIG. 7B and outputs the square waves as the first (or second) information signal.

After step 150, the first and second direction detecting portions 172 and 174 check the generation orders of the first and second information signals and detect components of first and second directions of a moving direction from the checked orders in step 152. Step 152 of detecting a moving direction will be described in greater detail below.

Figure 8A:
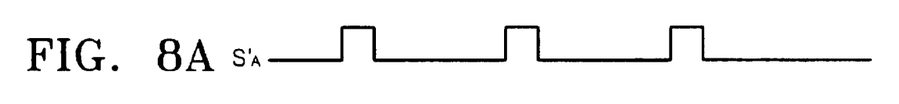
FIGS. 8A through 8C illustrate waveforms of first information signals, which are generated when first strips are touched in a first positive direction, respectively.
Figure 8B:
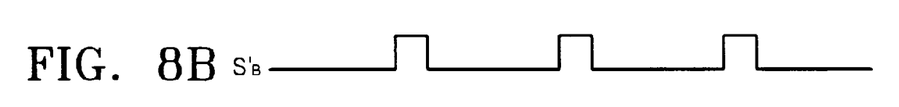
Figure 8C:
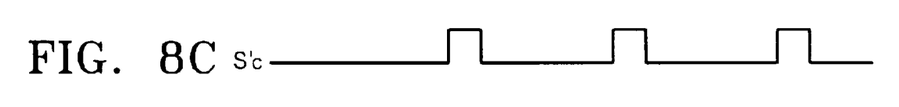

FIGS. 8A through 8C illustrate waveforms of first information signals $S_A$, $S_B$, and $S_C$, which are generated when first strips shown in FIG. 1A are touched in a first positive direction, respectively.

When the user touches the first strips shown in FIG. 1A in the order of 34, 32, 30, 28, . . . in a first positive direction, touch signals are generated in the order of $S_A$, $S_B$, $S_C$, $S_A$, $S_B$, $S_C$, . . . Thus, the first information signals $S_A'$, $S_B'$, and $S_C'$ are generated in the order of $S_A'$, $S_B'$, and $S_C'$. As shown in FIGS. 8A, 8B, and 8C, the first information signals $S_A'$, $S_B'$, and $S_C'$ are generated by the signal converting portion 170. In such a case, the first direction detecting portion 172 determines that the component of the first direction of the moving direction is positive (+) when the first information signals $S_A'$, $S_B'$, and $S_C'$, which are input into the signal converting portion 170, are generated in the order of $S_A'$, $S_B'$, $S_C'$, $S_A'$, $S_B'$, $S_C'$, . . . at a "high" logic level.

Figure 9A:
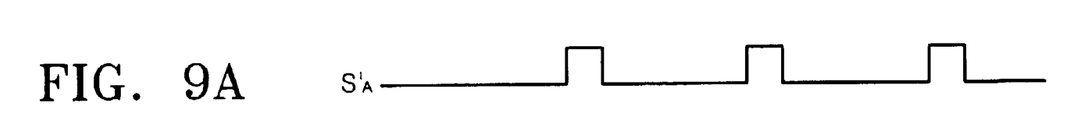
FIGS. 9A through 9C illustrate waveforms of the first information signals, which are generated when the first strips are touched in a first negative direction, respectively.
Figure 9B:
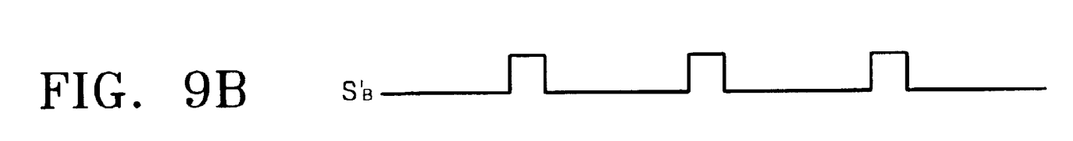
Figure 9C:
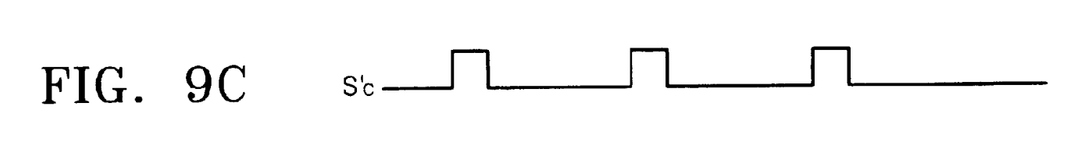

FIGS. 9A through 9C illustrate waveforms of the first information signals $S_A$, $S_B$, and $S_C$, which are generated when the first strips shown in FIG. 1A are touched in a first negative direction, respectively.

When the user touches the first strips shown in FIG. 1A in the order of 10, 12, 14, 16, 18, . . . in a first positive direction, touch signals are generated in the order of $S_C$, $S_B$, $S_A$, $S_C$, $S_B$, $S_A$, . . . Thus, the first information signals $S_A'$, $S_B'$, and $S_C'$ are repeatedly generated in the order of $S_C'$, $S_B'$, and $S_A'$. As shown in FIGS. 9A, 9B, and 9C, the first information signals $S_A'$, $S_B'$, and $S_C'$ are generated by the signal converting portion 170. In such a case, the first direction detecting portion 172 determines that the component of the first direction of the moving direction is negative (−) when the first information signals $S_A'$, $S_B'$, and $S_C'$, which are input from the signal converting portion 170, are generated in the order of $S_C'$, $S_B'$, $S_A'$, $S_C'$, $S_B'$, $S_a$, . . . at a "high" logic level.

For this purpose, the first direction detecting portion 172 is implemented by a first order storing part 204 and a third comparing part 206. The first order storing part 204 stores the order in which the first information signals $S_A'$, $S_B'$, and $S_C'$ are generated when the first strips shown in FIG. 1A are touched in a first positive or negative direction, that is, the order in which the first information signals $S_A'$, $S_B'$, and $S_C'$ become a "high" logic level. The third comparing part 206 compares the order in which the first information signals $S_A'$, $S_B'$, and $S_C'$ are presently generated, with the order in which the first information signals $S_A'$, $S_B'$, and $S_C'$ were previously generated and which are read from the first order storing part 204, detects the component of the first direction of the moving direction from the result of comparison, and outputs the detected component of the first direction.

For example, assuming that the first information signal $S_A'$ is the highest bit and the first information signal $S_C'$ is the lowest bit, as shown in FIGS. 8A through 8C, when patterns of bits of the first information signals $S_A'$, $S_B'$, and $S_C'$, which are presently generated, are '001' (wherein '0' denotes "low" logic level, and '1' denotes "high" logic level) and patterns of bits of the first information signals $S_A'$, $S_B'$, and $S_C'$, which were previously generated and stored in the first order storing part 204, are '010', the third comparing part 206 recognizes that '001' are generated after '010' from the result of comparison and determines that the moving direction is a first positive direction. However, as shown in FIGS. 9A through 9C, when the patterns of bits stored in the first order storing part 204 is not '010' but '100', the third comparing part 206 recognizes that '001' are generated after '100' from the result of comparison and determines that the moving direction is a first negative direction.

Figure 10A:
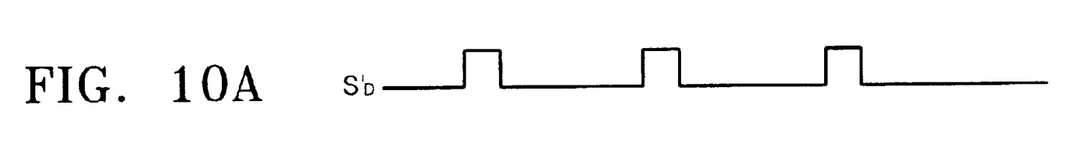
FIGS. 10A through 10C illustrate waveforms of second information signals, which are generated when second strips are touched in a second positive direction, respectively.
Figure 10B:
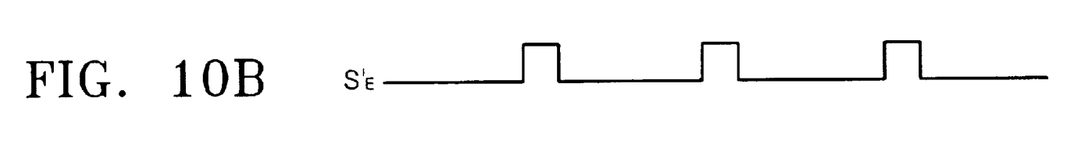
Figure 10C:
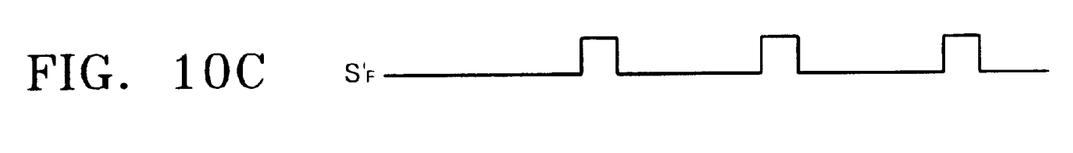

FIGS. 10A through 10C illustrate waveforms of second information signals $S_D'$, $S_E'$, and $S_F'$, which are generated when second strips shown in FIG. 1B are touched in a second positive direction, respectively.

When the user touches the second strips shown in FIG. 1B in the order of 50, 52, 54, 56, . . . in a second positive direction, touch signals are generated in the order of $S_D$, $S_E$, $S_F$, $S_D$, $S_E$, $S_F$, . . . Thus, the second information signals $S_D'$, $S_E'$, and $S_F'$ are repeatedly generated in the order of $S_D'$, $S_E'$, and $S_F'$. As shown in FIGS. 10A, 10B, and 10C, the second information signals $S_D'$, $S_E'$, and $S_F'$ are generated by the signal converting portion 170. In such a case, the second direction detecting portion 174 determines that the component of the second direction of the moving direction is positive (+) when the second information signals $S_D'$, $S_E'$, and $S_F'$ are generated in the order of $S_D'$, $S_E'$, $S_F'$, $S_D'$, $S_E'$, $S_F'$, . . . at a "high" logic level.

Figure 11A:
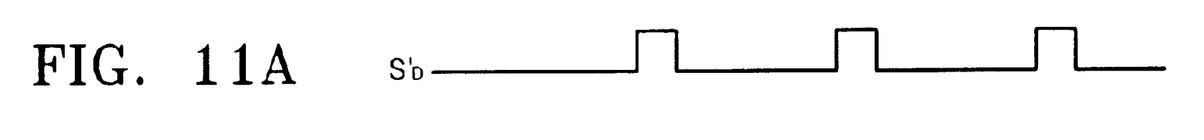
FIGS. 11A through 11C illustrate waveforms of the second information signals, which are generated when the second strips are touched in a second negative direction, respectively.
Figure 11B:
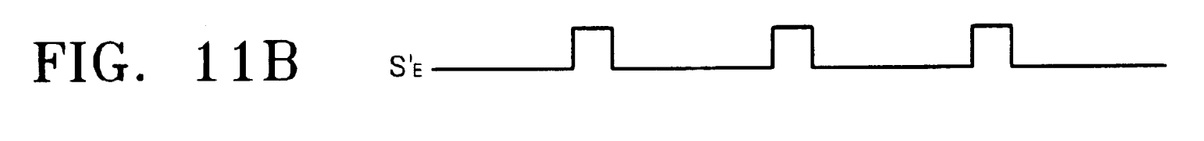
Figure 11C:
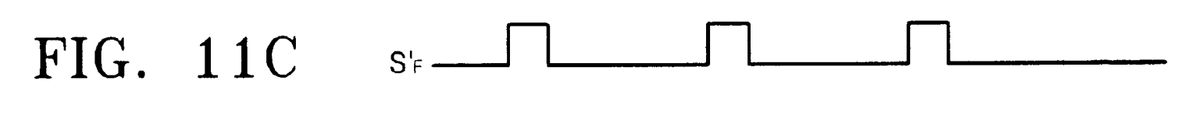

FIGS. 11A through 11C illustrate waveforms of the second information signals $S_D'$, $S_E'$, and $S_F'$ which are generated when the second strips shown in FIG. 1B are touched in a second negative direction, respectively.

When the user touches the second strips shown in FIG. 1B in the order of 74, 72, 70, 68, 66, . . . in a second negative direction, touch signals are generated in the order of $S_F$, $S_E$, $S_D$, $S_F$, $S_E$, $S_D$, . . . Thus, the second information signals $S_D'$, $S_E'$, and $S_F'$ are repeatedly generated in the order of $S_F'$, $S_E'$, and $S_D'$. As shown in FIGS. 11A, 11B, and 11C, the second information signals $S_D'$, $S_E'$, and $S_F'$ are generated by the signal converting portion 170. In such a case, the second direction detecting portion 174 determines that the component of the second direction of the moving direction is negative (−) when the second information signals $S_D'$, $S_E'$, and $S_F'$ are generated in the order of $S_F'$, $S_E'$, $S_D'$, $S_F'$, $S_E'$, $S_D'$, . . . at a "high" logic level.

For this purpose, the second direction detecting portion 174 is implemented by a second order storing part 208 and a fourth comparing part 210. The second order storing part 208 stores the order in which the second information signals $S_D'$, $S_E'$, and $S_F'$ are generated when the second strips shown in FIG. 1B are touched in a second positive or negative direction. The fourth comparing part 210 compares the order in which the second information signals $S_D'$, $S_E'$, and $S_F'$ are presently generated, with the order in which the second information signals $S_D'$, $S_E'$, and $S_F'$ were previously generated and which are read from the second order storing part 208, detects the component of the second direction of the moving direction from the result of comparison, and outputs the detected component of the second direction.

For example, assuming that the second information signal $S_D'$ is the highest bit and the second information signal $S_F'$ is the lowest bit, as shown in FIGS. 10A through 10C, when patterns of bits of the second information signals $S_D'$, $S_E'$, and $S_F'$, which are presently generated, are '001' and patterns of bits of the second information signals $S_D'$, $S_E'$, and $S_F'$, which were previously generated and stored in the second order storing part 208, are '010', the fourth comparing part 210 recognizes that '001' are generated after '010' from the result of comparison and determines that the moving direction is a second positive direction. However, as shown in FIGS. 11A through 11C, when the patterns of bits stored in the second order storing part 208 is not '010' but '100', the fourth comparing part 210 recognizes that '001' are generated after '100' from the result of comparison and determines that the moving direction is a second negative direction.

When the user touches the first and second strips in a direction with a left inclination of 45 degrees from the second direction, the moving direction has the components of the first direction and the second direction. In this case, in the apparatus and method for detecting pointing information according to the present invention, the component of the first direction and the component of the second direction are separately obtained as described above, and the obtained components of the first and second directions are synthesized, thereby determining the amount of movement.

In step 152, the first movement amount detecting portion 176 measures the number of times in which the first information signals $S_A'$, $S_B'$, and $S_C'$ are generated for every predetermined time period, for example, the number of times in which the first information signals $S_A'$, $S_B'$, and $S_C'$ are generated in each predetermined time period at a "high" logic level, determines the measured number of times as the amount of movement of the first direction and outputs the amount of movement of the first direction. Further, in step 152, the second movement amount detecting portion 178 measures the number of times in which the second information signals $S_D'$, $S_E'$, and $S_F'$ are generated in each predetermined time period, for example, the number of times in which the second information signals $S_D'$, $S_E'$, and $S_F'$ are generated in each predetermined time period at a "high" logic level, determines the measured number of times as the amount of movement of the second direction and outputs the determined amount of movement of the second direction. The predetermined time may be, for example, 1 ms.

For this purpose, the first movement amount detecting portion 176 is implemented by a first ORing unit 212 and a first counter 214. The first ORing unit 212 performs an OR operation of the first information signals $S_A'$, $S_B'$, and $S_C'$ and outputs the result of OR operation to a clock terminal of the first counter 214. The first counter 214 performs a counting operation in response to the result of OR operation and outputs the result of counting in each predetermined time period as the amount of movement of the first direction.

The second movement amount detecting portion 178 is implemented by a second ORing unit 216 and a second counter 218. The second ORing unit 216 performs an OR operation of the second information signals $S_D'$, $S_E'$, and $S_F'$ and outputs the result of OR operation to a clock terminal of the second counter 218. The second counter 218 performs a counting operation in response to the result of OR operation and outputs the result of counting in each predetermined time period as the amount of movement of the second direction.

The apparatus for detecting pointing information according to the present invention can output detected pointing information, that is, a moving direction and the amount of movement, via wireless or wire, for example, to a signal processing unit (not shown). In a case where the pointing information are output via wireless, the apparatus for detecting pointing information shown in FIG. 6 may further include a radio frequency signal converting portion 180. For this purpose, in the method for detecting pointing information shown in FIG. 5, after step 152, the radio frequency signal converting portion 180 converts moving directions and the amount of movement, which are input in the first and second direction detecting portions 172 and 174 and the amount-of-movement first and second detecting portions 176 and 178, into radio frequency signals and outputs the radio frequency signals to an output terminal OUT.

A signal processing unit (not shown) performs signal-processing of pointing information output from the output terminal OUT and adjusts a pointer according to the moving directions and the amount of movement, which are obtained by the result of signal processing. In a case where the pointing apparatus according to the present is, for example, a mouse, a signal processing unit is connected to the mouse in a main board of a personal computer (PC), processes signals output from the mouse and calculates a position in which the mouse is moved.

As described above, in the pointing apparatus using a piezoelectric film according to the present invention, the method for producing the apparatus, and apparatus and method for detecting pointing information for the pointing apparatus, the pointing apparatus can be folded and thus is convenient to carry, can input pointing information by using a part of the human body, for example, a finger without a special tool such as a ball or pen, and thus is convenient to use and its manufacturing costs can be reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A pointing apparatus using a piezoelectric film, the apparatus comprising:
   a plurality of first strips arranged in a first direction at a first predetermined interval, each of which is extended in a second direction perpendicular to the first direction and at least some of the plurality of first strips is touched when a pointer is moved in the first direction;
   a plurality of second strips, which are lapped over the plurality of the first strips and arranged in the second direction at a second predetermined interval, each of which is extended in the first direction and at least some of the plurality of second strips is touched when the pointer is moved in the second direction,
   wherein each of the first and second strips generates electric charges in a quantity corresponding to pressure applied when a respective one of each of the first and second strips is touched and outputs touch signals having levels corresponding to the quantity of the electric charges; and
   a first direction detecting portion configured to detect a component of a moving direction of the pointer an order in which the touch signals are generated.

2. The apparatus of claim 1, wherein each of the first and second strips is a piezoelectric film formed of polyvinylidene fluoride (PVDF).

3. The apparatus of claim 1, further comprising:
   a signal converting portion for converting the touch signals generated from the first strips into first square waves, outputting the square waves as first information signals, converting the touch signals generated from the second strips into second square waves, and outputting the second square waves as second information signals;
   said first direction detecting portion for checking the order in which the first information signals are generated, and detecting the component of the first direction of the moving direction from the checked order; and a second direction detecting portion for checking an order in which the second information signals are generated and, detecting a component of the second direction of the moving direction from the checked order; and wherein the moving direction corresponds to the pointing information.

4. The apparatus method of claim 3, further comprising:

a first movement amount detecting portion for measuring the number of times in which the first information signals are generated in each predetermined time period, and outputting the number of times as the amounts of movement of the first direction; and a second movement amount detecting portion for measuring the number of times in which the second information signals are generated in each predetermined time period, and outputting the number of times as the amount of movement of the second direction, wherein the amount of movement corresponds to the pointing information.

5. The apparatus of claim 4, further comprising a radio frequency signal converting portion for converting the moving direction and the amount of movement, which are input from the first and second direction detecting portions and from the first and second movement amount detecting portions, respectively, into a radio frequency signal, and outputting the radio frequency signal.

6. The apparatus of claim 4, wherein the signal converting portion comprises:

a first comparing part for comparing each of levels of the touch signals generated from the first strips with a reference voltage and outputting the results of comparison as the first information signals; and a second comparing part for comparing each of levels of the touch signals generated from the second strips with the reference voltage and outputting the results of comparison as the second information signals.

7. The apparatus of claim 4, wherein the first direction detecting portion comprises:

a first order storing part for storing the order in which the first information signals are generated when the first strips are touched in the first direction or the reverse direction of the first direction; and a third comparing part for comparing the order in which the first information signals are presently generated, with the order in which the first information signals were previously generated and which are read from the first order storing part, and detecting the component of the first direction of the moving direction from the result of comparison.

8. The apparatus of claim 4, wherein the second direction detecting portion comprises:

a second order storing part for storing the order in which the second information signals are generated when the second strips are touched in the second direction or the reverse direction of the second direction; and a fourth comparing part for comparing the order in which the second information signals are presently generated, with the order in which the second information signals were previously generated and which are read from the second order storing part, and detecting the component of the second direction of the moving direction from the result of comparison.

9. The apparatus of claim 4, wherein the first movement amount detecting portion comprises:

a first ORing unit for performing an OR operation of the first information signals and outputting the result of OR operation; and a first counter for performing a counting operation in response to the result of the OR operation input from the first ORing unit and outputting the result of counting in each predetermined time period as the amount of movement of the first direction.

10. The apparatus of claim 4, wherein the second movement amount detecting portion comprises:

a second ORing unit for performing an OR operation of the second information signals and outputting the result of the OR operation; and a second counter for performing a counting operation in response to the result of the OR operation input from the second ORing unit and outputting the result of counting in each predetermined time period as the amount of movement of the second direction.

11. A method for detecting pointing information of a pointing apparatus using a piezoelectric film, the apparatus comprising a plurality of first strips arranged in a first direction at a first predetermined interval, each of which is extended in a second direction perpendicular to the first direction and at least some of the plurality of first strips is touched when a pointer is moved in the first direction; and a plurality of second strips, which are lapped over the plurality of the first strips and arranged in the second direction at a second predetermined interval, each of which is extended in the first direction and at least some of the plurality of second strips is touched when the pointer is moved in the second direction, wherein each of the first and second strips generates electric charges in a quantity corresponding to pressure applied when a respective one of each of the first and second strips is touched and outputs touch signals having levels corresponding to the quantity of the electric charges, and moving direction and amount of movement of the pointer are determined by the number of times and the order in which the touch signals are generated, the method comprising:

(a) converting the touch signals generated from the first strips into first square waves to obtain the first information signals and converting the touch signals generated from the second strips into second square waves to obtain the second information signals; and (b) checking the order in which the first and second information signals are generated and detecting the components of the first and second directions from the checked order.

12. The method of claim 11, wherein in step (b), the numbers of times in which the first and second information signals are generated in each predetermined time period are measured, and the numbers of times are determined as the amounts of movement of the first and second directions, respectively.

13. A pointing apparatus using a piezoelectric film, the apparatus comprising:

a plurality of first means arranged in a first direction at a first predetermined interval, each of which is extended in a second direction prependicular to the first direction and at least some of the plurality of first strip means is touched when a pointer is moved in the first direction; and a plurality of second strips means lapped over the plurality of the first strips and arranged in the second direction at a second predetermined interval, each of which is extended in the first direction and at least some of the plurality of second strip means is touched when the pointer is moved in the second direction, each of the first and second strip means for generating electric charges in a quantity corresponding to pressure applied when a respective one of each of the first and second strip means is touched and for outputting touch signals having levels corresponding to the quantity of the electric charges, means for determining a moving direction and an amount of movement of the pointer by a number of times and an order in which the touch signals are generated.

14. The pointing apparatus of claim 13, said determining means comprising:

means for converting the touch signals generated from the first strip means into first square waves for obtaining the first information signals and for converting the touch signals generated from the second strip means into second square waves for obtaining the second information signals; and means for checking the order in which the first and second information signals are generated and for detecting the components of the first and second directions from the checked order.

15. The apparatus of claim 14, wherein said means for checking measures the numbers of times in which the first and second information signals are generated in each predetermined time period, and determines the numbers of times as the amounts of movement of the first and second directions, respectively.

* * * * *